Jan. 20, 1942. M. GREINER Re. 22,010

ELECTROMAGNETIC TOOL OF THE PERCUSSION TYPE

Original Filed Oct. 31, 1935 2 Sheets-Sheet 1

Inventor:

Max Greiner

ELECTROMAGNETIC TOOL OF THE PERCUSSION TYPE

Original Filed Oct. 31, 1935 2 Sheets-Sheet 2

Inventor:
Max Greiner

Reissued Jan. 20, 1942

Re. 22,010

UNITED STATES PATENT OFFICE 22,010

ELECTROMAGNETIC TOOL OF THE PERCUSSION TYPE

Max Greiner, Berlin-Charlottenburg, Germany

Original No. 2,100,660, dated November 30, 1937, Serial No. 47,713, October 31, 1935. Application for reissue November 10, 1939, Serial No. 303,908. In Germany April 18, 1934

26 Claims. (Cl. 172—126)

My invention relates to electro-magnetically operated reciprocatory tools of the percussion type, such as chisels or hammers, and, more particularly, to tools of this type operated by direct current controlled by the reciprocatory mechanism of this tool.

An object of my invention is the provision of an electro-magnetically operated reciprocatory tool which is adapted for continuous service and will give a high specific power output in relation to its weight.

I attain this object by so dimensioning and combining the elements of the tool that the electric and magnetic losses and the consequent rise of temperature in continuous service is kept below satisfactory limits.

Further objects of my invention are to provide improved means to intermittently interrupt and close the electric circuits of the magnet coils of the tool and to provide improved spark-quenching condensers, whereby an unexcelled reliability of the interrupting contacts in continuous service is attained.

Further objects of my invention will appear from the description following hereinafter and the features of novelty will be pointed out in the claims.

My invention will be described hereinafter by way of its application to a reciprocatory tool of the percussion type, various modifications of which are illustrated in the drawings.

Figure 2:
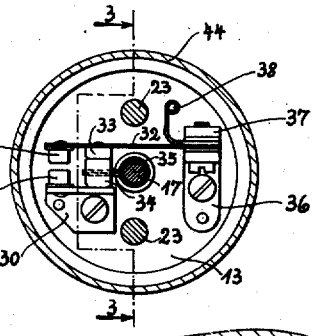
Fig. 2 is a section taken along line 2—2 of Fig. 1.
Figure 7:
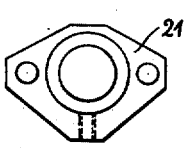
Figure 1:
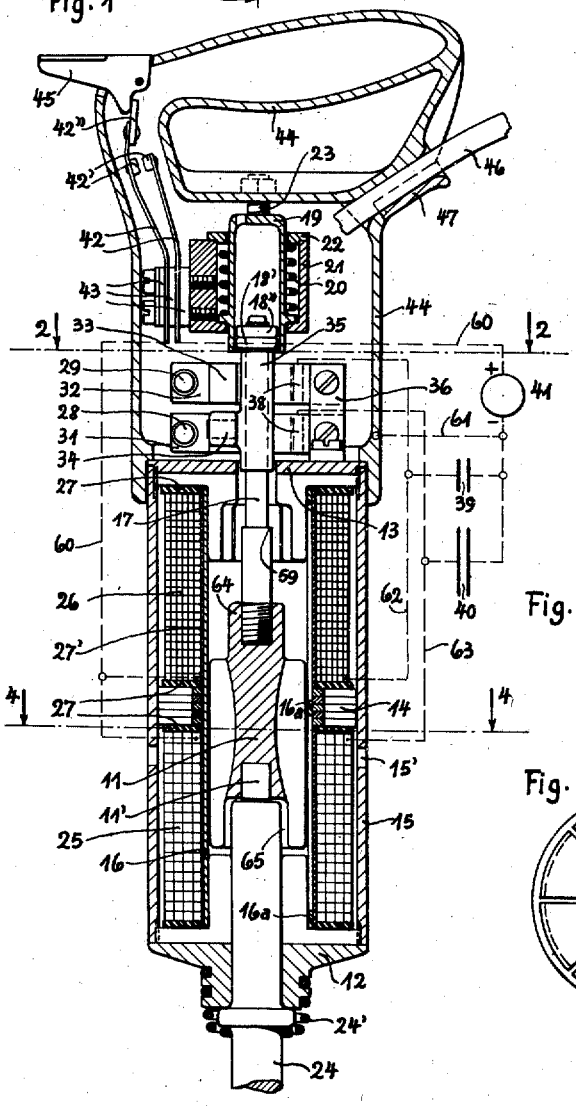
Fig. 1 is an axial section through my improved tool.
Figure 3:
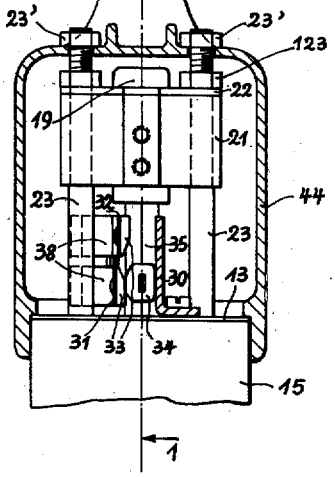
Figure 4:
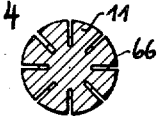
Figure 8:
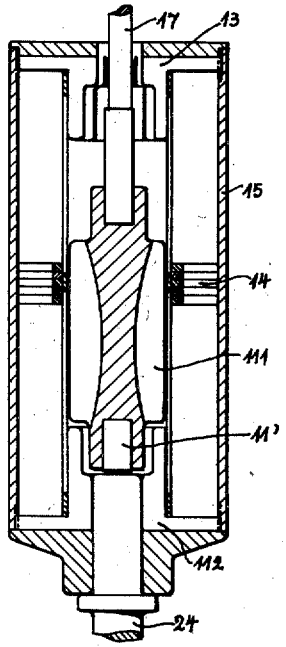
Figure 9:
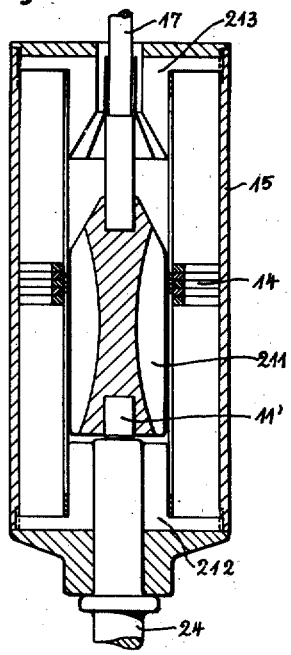
Figure 11:
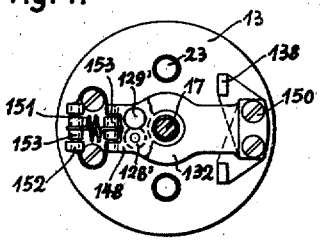
Figure 13:
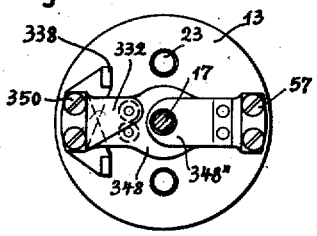
Figure 10:
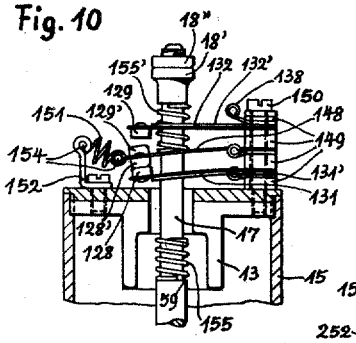
Figure 10A:
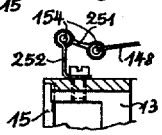
Figure 12:
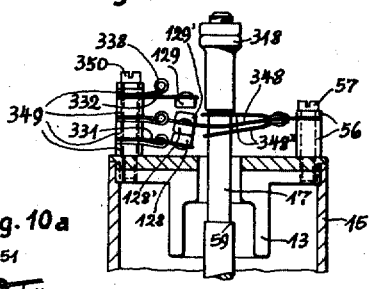

Fig. 3 illustrates a side-view of the upper portion of Fig. 1, the casing being shown in section along line 3—3 of Fig. 2, Figs. 4, 5, 6 and 7 represent various elements of the mechanism illustrated in Fig. 1, Fig. 4 being a section of the armature taken along line 4—4 of Fig. 1, Figs. 8 and 9 are partial axial sections through modified embodiments, the electrical controlling means and coils being omitted, Fig. 10 is an elevation of a modified circuit interrupter for a tool constructed in accordance with the preceding figures, Fig. 10*a* is a modification of a detail of Fig. 10, Fig. 11 is a plan-view of the mechanism shown in Fig. 10, Fig. 12 is an elevation of a further modification of the circuit interrupter, Fig. 13 shows a plan-view of Fig. 12.

In Fig. 1, 15 designates a mantle tube of soft steel which is closed at its upper end by a pole-piece 13 having a peripheral flange overlying the end face of the tube 15 and is closed at its lower end by a pole-piece 12 each pole-piece having an axial boring. The parts 12 and 13 consist of soft steel too and are firmly united with the tube 15. For this purpose, they may be threaded and screwed into the tube 15. An annular member 14 preferably of a laminated structure comprising a plurality of sheet-steel rings of a thickness of about one-sixteenth of an inch riveted together is loosely inserted in the tube 15 intermediate the ends thereof.

Figure 6:
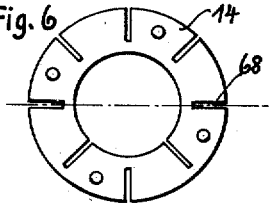
Figure 5:
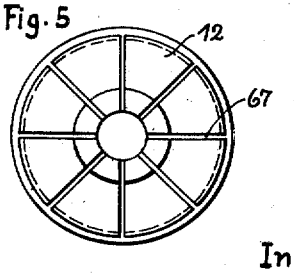

As shown in Fig. 6, the laminated annular member 14 is preferably provided with a plurality of radial slots, the object of which will be explained later. The pole-pieces 12 and 13 which are preferably likewise provided with radial slots or recesses, as shown in Fig. 5, support a coaxially arranged tube 16 of smaller diameter which is fitted on cylindrical projections of the pole-pieces. This tube may consist of a suitable insulating material of high mechanical strength such as Bakelized paper or fabric, or it may consist of a diamagnetic metal, such as bronze. In the latter case, the tube 16 is provided with two longitudinal slots separated from each other and from the end faces of the tube by bridge-pieces 16*a*. These slots will reduce eddy-currents. The tube 16 extends through and engages the inner periphery of the annular member 14.

Within the tube 16, a reciprocatory armature plunger 11 is guided which also consists of soft steel and has an axial boring at its lower end, in which a member 11′ of hardened steel is firmly fitted which is adapted to impart percussive blows to a shank 24 of an interchangeable tool, such as a chisel, a riveting stock or the like. The shank 24 is slidably guided in the axial boring of the member 12 and has a collar normally bearing against the lower end face thereof. A helical spring 24′ keeps the shank 24 resiliently in its normal position and prevents the shank from being thrown out of the boring of the member 12. The spring 24′ is screwed on threads provided on a lower cylindrical projection of the member 12 and its lower end of smaller diameter engages below the collar of the shank 24.

The frame elements 12, 13, 14 and 15 and the armature plunger 11 guided therein constitute two substantially closed magnetic flux circuits of two coils 25 and 26, the plunger 11 acting as a reciprocatory armature and the ring 14 being alternately effective in one or the other of the two flux circuits. The function of the peculiar form of the inner projections of the pole-pieces 12 and 13 and of the associated ends of the plunger 11 will be explained later. The coils 25, 26 which are alternately energized cause the plunger to be reciprocated. At the end of its downward stroke, the plunger strikes the tool shank 24. The upward movement of the plunger is limited by a rod 17 which is screwed or pressed into an upper cylindrical projection 64 of the plunger and projects into a tube-shaped cap 19 provided with a cover-wall forming a stop for the rod 17. The cap 19 is guided for ready axial movement within a housing 21 provided with a cover plate 22 and enclosing a helical buffer spring 20. The upper end of this spring bears against the cover plate 22 and the lower end against a collar of the cap 19, whereby the cap is resiliently held in the normal position shown in Fig. 1.

The cap 19 is preferably made of a high-grade steel, such as chromium-nickel steel, whereas the rod 17 consists preferably of a diamagnetic material of high mechanical strength, such as diamagnetic nickel-steel, beryllium bronze or the like in order to improve the magnetic properties of the device.

The upper end of the rod 17 is reduced and threaded and provided with two annular nuts 18' and 18'' which serve to slidably guide the upper end of the rod in the cap 19 with little play and to operate the contact mechanism which will be described later. The spring-housing 21 of which a plan view is shown in Fig. 7 has two vertical borings through which the upper reduced ends of bolts 23 pass for attachment of the spring housing to a casting 44, as shown in Fig. 3, the housing being held in position on the bolts by nuts 123. The bolts 23 are screwed into the flange of the member 13 and are provided with outer nuts 23' bearing on the top of the casting 44. This casting 44 has a tubular lower end engaging over the upper end of the tube 15 and having an inner collar bearing upon the member 13. Hence, the bolts 23 and the nuts 123 and 23' will firmly unite the tube 15, the cover plate 13, the housing 21 and the casting 44. The upper end of the casting 44 is formed as a handle. To reduce its weight, it is preferably made of light metal.

The magnet coils 25 and 26 are wound of insulated copper wire or aluminum wire and are impregnated with varnish or another suitable compound and are baked in an oven, whereby the coils will be given the required rigidity which must be comparatively high because of the strong percussions acting on them in operation. Preferably, the coils are directly wound on the tube 16. If this tube is made of metal, an insulating layer 27' must be interposed, and discs 27 of insulating material are provided for supporting the coils on the interposed annular member 14 and on the pole-pieces 12 and 13. After the baking operation, the tube 16 and the coils, the annular member 14 and the insulating discs will constitute a rigid body which is preferably inserted in the tube 15 from below and is firmly clamped in position therein by the member 12 inserted into the lower end of tube 15.

Having now described the organization of the mechanical and magnetical elements of the device, I shall now proceed to explain the circuit controlling means.

The intermittent energization and de-energization of the coils is effected by two pairs of contacts, one pair 28, 28 being coordinated to coil 25 and one pair 29, 29' being coordinated to coil 26, compare Fig. 2. Preferably, each contact consists of a member of steel on which a thin plate of tungsten is welded. One of the contacts 28 which is not shown and the contact 29' are rigidly attached one above the other by welding, riveting or screwing in an angular bracket 30 of brass, bronze or steel which is firmly attached to the flange of member 13 by suitable bolts. The counter-contacts 28 and 29 are attached to spring-leaves 31 and 32 respectively, which consist of steel or bronze and are suitably clamped by bolts between a second bracket 36 (Fig. 2) and a counterplate 37, insulating plates being interposed between the spring-leaves 31, 32 and the elements 36, 37. The bracket 36 is attached to the flange of member 13 by bolts.

In order to conduct the current to and from the contacts, two terminal members 38 of copper or brass are clamped in position below the counterplate 37, as shown in Figs. 2 and 3. The contact springs 31 and 32 are so bent near their points of attachment to the bracket 36 that they tend to normally press the counter contacts 28 or 29 firmly against the contacts 28 or 29', whereby the pairs of contacts will be given the tendency to resiliently stay in and return to closed position.

Cams 33 of bronze or steel are riveted to the springs 31 and 32 as shown in Fig. 3. These cams cooperate with a sliding member 34 of insulating material of high mechanical strength such as Bakelized fabric which is slidably guided on the vertical arm of bracket 30 and is attached to a lateral lug of a sleeve 35 slidably mounted on the rod 17. The sliding member 34 is so shaped that it may alternately ride on the two cams 33 and thereby open one or the other of the two pairs of contacts, whereas both contacts are temporarily closed when the sliding member 34 passes through its intermediate position.

The sleeve 35 which may be bent of steel sheet-metal or may consist of a short piece of tube, may be alternately engaged by a shoulder 59 of the rod 17 and by the nut 18'. Its length is so limited with regard to the distance of the shoulder from the nut that the sleeve 35 is positively carried along a short distance by the plunger 11 only, whenever the same approaches the ends of its strokes, and may then freely continue its movements under its inertia a little farther, whereby a rebound incident to the arrival of the sleeve 35 in its end positions will be avoided.

For putting the tool in and out of operation, I have provided a switch comprising two spring-leaves 42 carrying contacts 42' riveted thereto. The spring-leaves are bolted to the housing 21, suitable insulating plates 43 being interposed. The end of the longer spring leaf carries an insulating piece 42'' which engages a lug of a finger piece 45 which is pivoted to the casting 44 and extends outwardly through a slot provided therein. Pressure exerted on the finger piece by the operator's thumb will close the contacts 42, 42'.

Current is supplied to the tool from a suitable source by a flexible cable 46 containing four conductors, two of which serve to conduct the operating current, while two additional conductors of smaller cross-section connect the device with condensers 39 and 40 which are diagrammatically shown in Fig. 1 and will be described later. The cable 46 is attached to the casting 44 by a suitable clamping member 47.

In Fig. 1, I have diagrammatically shown the circuit connections of the coils, the contacts and the cable.

The positive terminal of a suitable source 41 of direct current which may be a generator or a battery, is connected by a lead 60 with the switch 42 from which the lead 60 extends to the terminals of the coils 25 and 26. The coils are so connected up as to energize their magnetic circuits in opposite directions, that is to say, the flux of coil 25 passes upwardly relative to the plunger 11, whereas the flux of coil 26 passes downwardly. Owing to this arrangement, any residual magnetism which otherwise might remain in the steel parts of the device after the reversal of the circuits will be eliminated whereby the plunger 11 is prevented from sticking magnetically in one of its end positions.

The ends of the coils are connected with the terminals 38 by leads 62, 63, as illustrated in Fig. 2, the coil 25 being connected to the contact spring 31 and the coil 26 to the contact spring 32 and thereby to the contacts 28 and 29 respectively. The countercontacts are alternately connected through the bracket 30 with the structure of the device comprising the casting 44 and the tube 15, wherefrom a conductor 61 leads to the negative terminal of the source 41 of current. To reduce the sparking of the contacts, quenching condensers 39 or 40 respectively, are arranged in shunt to the pairs of contacts. The condenser 40 has a substantially larger capacity than the condenser 39 for a reason which will be explained later.

The operation of the tool is as follows: When the sliding member 34 assumes the position shown in Figs. 1 and 3 and when the operator closes the contacts 42' by depressing the finger piece 45, the current flows by way of the pair of contacts 29, 29' through the coil 26 only, whereas the coil 25 is not energized. Consequently, a flux is produced which will drive plunger 11 upwardly with increasing velocity until the upper end of rod 17 abuts against the end face of the cap 19. Shortly before the arrival of the plunger in its upper end position the sleeve 35 is engaged by the shoulder 59 and carried along upwardly together with the sliding member 34, whereby the sliding member 34 first permits the pair of contacts 28, 28 to contact with each other and shortly afterwards opens the pair of contacts 29, 29'. For a short period both contacts are closed at the same time, whereby both coils will be energized simultaneously. Immediately after the contacts 29, 29' have been opened, the plunger 11 is resiliently arrested by the spring 20 which will reverse the motion and accelerate the plunger in downward direction.

Because of this fact, the plunger will immediately attain a considerable initial velocity on its downward effective stroke, this initial velocity corresponding to the energy mechanically imparted to the plunger by the spring 20. The energization of coil 25 whose circuit is closed shortly prior to the reversal of motion further increases the speed of the plunger 11 on its effective stroke until the plunger strikes the shank 24 of the tool and transmits thereto all or nearly all of its momentum as the effective power output, the proportion of the momentum so transmitted depending on the particular conditions of operation of the tool, for instance on the material worked upon. On the downward stroke of the plunger, the nut 18' will engage the sleeve 35 and carry the same along downwardly, whereby the sliding member 34 will so control the contacts as to deenergize coil 25 and as to energize coil 26, thereby causing a reversal of motion, and the cycle of operation above described will be repeated.

The rod 17 may be considered part of the armature as far as its mechanical cooperation with the buffer spring 20 is concerned, and could be made integral with the armature, if desired. The cap 19, on the other hand, may be regarded as a part of the buffer spring. Therefore, I shall briefly refer in the claims to the cooperation between the armature and the buffer spring by stating that the buffer spring is arranged to be struck by the armature.

The fact that the downward or striking stroke of the plunger takes place at a higher velocity than the upward or return stroke because of the initial speed imparted to the plunger by the buffer spring 20, and, therefore, takes place within a substantially shorter period of time, is of controlling importance for my invention, as will appear later. As the plunger itself positively controls the operation of the interrupter, the period of energization of the "striking" coil 25 is substantially shorter than that of the "returning" coil 26.

The broad principle of operation of the device and the combination of its elements were known prior to my invention except for certain features to be described later. I have been able for the first time to avoid excessive heating of the device upon continued operation by so constructing, dimensioning and mutually arranging the elements of the device that the efficiency is considerably increased by a reduction of the losses, particularly the ohmic losses, in relation to the electric energy consumed. Furthermore, my invention results in a considerable increase of the effective energy of the percussion produced in relation to the weight of the device.

As a result of an extended investigation of the theory underlying the function of the device and of extended tests, I have found that the ohmic losses may be reduced to quite satisfactory limits by providing for a definite relationship between the mechanical motion of the armature plunger 11 and the timed variable energization of the magnet coils. More particularly, I have found that this relationship may be defined with satisfactory exactness by the ratio of the electric time constant of each magnet coil (computed for the position of the armature at the beginning of its stroke produced by this coil) divided by the period of energization of the coil. This ratio will be termed the "time constant ratio" hereinafter. The period of energization depends on the number of reciprocations per time unit—due consideration to be given to the properties and timed operation of the interrupter—and is substantially shorter for the striking coil 25 than for the returning coil 26, as above explained. I have found that the percentage of the ohmic losses will become smaller the larger the time constant ratio is.

Therefore, according to my invention the electrical and mechanical elements of a reciprocatory tool of the percussion type are so dimensioned and organized that the time constant ratio of each coil will exceed the amount of .5 and will preferably vary between the limits of .7 and 1.0. As a rule, a further increase of this ratio beyond 1.0 would result in a design requiring excessive cost of manufacture and would not materially improve the efficiency.

My invention is based on the following phenomena: When the circuit of a coil constant inductivity is closed, the current will gradually rise to a maximum limit according to an exponential function of the time and will finally reach such limit determined by the voltage and the resistance. The rate at which the current increases depends on the time constant of the coil. In any instant during the initial energization of the coil, the relative ohmic loss computed as a fraction of the final maximum input of the coil is proportional to the square of the current computed as a fraction of the final maximum current. Hence, the specific ohmic loss at any instant computed as a percentage of the instantaneous input (which percentage determines the degree of efficiency) is directly proportional to the ratio of the instantaneous current to the final maximum current. Therefore, I endeavor to keep the instantaneous current as low as possible compared with the final value it would reach upon a continued energization of the coil. The same theory applies to a coil having a variable inductivity such as is the case with the coil of a reciprocatory tool because of the variation of its inductivity by the motion of the armature. If the motion of the armature is sufficiently rapid compared with the rate of the current increase, the current will never attain its theoretical final limit but will reach a certain maximum less than the final limit and will then drop because of the rapid increase in inductance consequent to the acceleration of the plunger until finally the coil will be de-energized.

By properly controlling these conditions in accordance with the above rule regarding the magnitude of the time constant ratio, it has been possible to reduce the relative ohmic losses to a degree permitting of a continuous operation of an electric hammer of considerable power.

The above rule is a result of extremely difficult and complicated theoretical investigations dealing with the timed development of the current and of the transformation of energy in the coils of tools of the reciprocatory armature type.

How the above-stated lower limits of the time constant ratio for both magnet coils can be attained will be evident for anyone skilled in the art, as the formulae for computing this ratio directly indicate the steps to be taken for increasing the ratio above the limit .5 or preferably above a limit between .7 and 1.0.

The attainment of this ratio will be considerably facilitated, however, by certain special measures which will be explained hereinafter.

The magnitude of the electric time constant of a coil at the beginning of the stroke to be produced thereby is proportional to the product. Square of the number of turns or windings multiplied with the permeance of the magnetic circuit interlinked with the coil (the flux being computed for the initial position of the armature) and further multiplied with the electric conductance of the coil. The magnetic permeance and the electric conductance are proportional to the ratio of the cross-section to the length of the circuit. Therefore, the time constant ratio may be increased by the following measures:

(1) Increase of the number of turns and of the cross-section of the conductor. This measure, however, is apt to result in large dimensions with a consequent prohibitive cost of manufacture and weight of the tool and, therefore, is applicable with narrow limits only.

(2) Increase of the permeance by a reduction of the length of the stroke and by increasing the diameter and by a suitable design of the ends of the armature or plunger with a view to increasing the permeance of the air gap between the pole-pieces 12 and 13 and the opposed end-faces of the armature 11 in the initial position of the latter. Preferably, the opposed faces are given a conical or a stepped cylindrical form, the end of the armature extending into the associated pole-piece or vice versa.

Various arrangements of this kind are shown in Figs. 1 and 8.

In the embodiment illustrated in Fig. 1, the lower end of the pole-piece 13 is provided with a cylindrical recess, into which the cylindrical projection 64 of the armature plunger 11 may enter when approaching the upper end of its stroke. Similarly, the shank 24 of the tool which leads the flux passing through member 12 projects a certain distance into a cylindrical lower recess 65 of the armature plunger 11. This arrangement reduces the reluctance produced by the air gap.

As pointed out hereinabove, the period of energization of the striking coil 25 is substantially shorter than that of the returning coil 26. Because of this fact, I prefer under certain circumstances, particularly for tools of higher power, to dimension both coils and/or the permeance thereof differently. Preferably, the permeance of the magnetic circuit interlinked with the returning coil is made larger than that of the striking coil. This will considerably aid in attaining a high time constant ratio of the returning coil.

In Fig. 9, I have illustrated a structure in which the initial permeance of the magnetic circuit of the returning coil is greater than that of the striking coil. The scale in which Fig. 9 is drawn is the same as that of Figs. 1 and 8, and the same reference numerals are applied to corresponding parts. It will be noted, however, that the cooperating faces of the pole-piece 213 and the armature plunger 211 are conical, whereas the cooperating faces of the pole-piece 212 and the armature plunger 211 are plane. Owing to this arrangement, the permeance of the magnetic circuit of the upper or returning coil 26 is larger than that of the lower or striking coil 25. If desired, the conical profile of the elements 213 and 211 may be replaced by a stepped profile as shown in Fig. 8.

(3) Increase of the frequency of oscillation of the armature by reducing the mass of the armature plunger without, however, reducing the cross-section thereof. The reduction of the mass need not impair the effective power of the tool, as the reduction in mass is compensated for by the incident increase of the velocity of the armature plunger.

The second object of my invention—increase of the specific percussive power—is attained by differently proportioning the magnet coils. This is an important feature of my invention. Preferably, the striking coil 25 is given a number of turns which is about half of that of the returning coil 26, and the cross-section of the wire of the striking coil 25 is about twice that of the wire of the returning coil. Owing to this arrangement, the ohmic resistance of the striking coil 25 is but a fraction of the resistance of the returning coil. As the ohmic resistance of each coil circuit includes the resistance of the leads, the contacts etc., the ratio of the ohmic resistances of both circuits may be in the approximate order of from one-half to one-sixth depending on the particular requirements of the tool under consideration. I have found that in most instances, the ratio to be preferred is about one-fourth. A consequence of the different dimensions of the coils is that the striking coil will take up a substantially larger electric energy than the returning coil, whereby the difference between the periods of energization is compensated for. In spite of the substantially shorter period of energization, the striking coil may produce the same or even a larger percussive power per stroke than the returning coil, and the unavoidable production of heat by both coils in operation will be substantially alike. Therefore, the number of turns and the wire cross-sections of both coils may be so proportioned that with a given voltage the current taken up by both coils will reach the maximum limit which is permissible with regard to a rise of temperature in operation. It will be appreciated that the theoretical maximum of working power will be thus attained with a tool of given size.

As a part of the mechanical energy imparted to the plunger by the returning coil is dissipated when the motion of the plunger is reversed by the buffer spring 20 owing to imperfect elasticity thereof and to mechanical friction, I prefer to increase the energy imparted to the plunger by the striking coil in proportion to that imparted by the returning coil. To this end, I make the space accommodating the striking coil larger than that accommodating the returning coil, for instance in the manner indicated in Figs. 8 and 9, in which the annular member 14 is arranged at a slightly smaller distance from the upper pole-piece than from the lower pole-piece. This has the further advantage of a reduction of the rebound of the plunger in its upper position and of the consequent loss of mechanical energy owing to imperfect elasticity of the buffer spring 20 and of mechanical friction.

While each of the above-described novel features of my invention, to wit a certain minimum limit of the time constant ratio and a difference between the dimensions of the coils, results in a substantial improvement per se, I prefer to combine both features and thus obtain a tool in which the mechanical energy transferred on the plunger in dependence of the electric energy taken up by the coils is so great and the mass of the armature plunger is so selected that the consequent frequency of oscillation will result in the desired magnitude of the time constant ratio.

While I prefer that each of the two coils should have a time constant ratio exceeding the aforestated limits, it is evident that a considerable improvement will result even if the striking coil only should have a time constant ratio of not less than .7, particularly if the returning coil consumes a small share of the total electric energy only.

Further measures for reducing the losses are concerned with the elements conducting the magnetic flux. It is well known in the art that the losses owing to eddy-currents may be reduced by forming the entire flux circuit of a laminated structure. Because of the extraordinary stresses set up in a tool of the percussion type, I recommend, however, to make all those parts at least of compact steel which directly participate in the striking function. In the device shown in Fig. 1, these elements are the armature plunger 11 and the pole-pieces 12 and 13. These elements are subject to a variable magnetic flux even if the device is operated with direct current. While this flux will induce a useful counter-electromotive force in the coil energized at any time, it will at the same time produce undesired eddy-currents in the magnetic material. If the magnetic elements would be formed by solid compact parts, these eddy-currents would become so strong as to materially reduce the efficiency. The production of eddy-currents would have the further disadvantage that the energy of the same will have to be supplied by the magnet coils, thus necessitating a larger current consumed and higher ohmic losses. Furthermore, the eddy-currents would partly countermagnetize the magnetic material, whereby the flux in the interior thereof would be considerably reduced, thus decreasing the permeance. In fact, the production of eddy-currents could practically jeopardize all of the above-explained advantages of my improvements.

In order to reduce the production of eddy-currents to an innocuous degree, I provide those elements conducting the flux, which promote the production of eddy-currents owing to a small circumference and a large cross-section, with suitably positioned slots subdividing the elements, these slots being so positioned that the mechanical strength of the elements with regard to the percussive stresses set up therein will not be materially affected. This is the reason why in Fig. 1 the armature 11 and the pole-pieces 12 and 13 and the annular member 14 are provided with radial slots disposed parallel to the axis of the tool.

Fig. 4 illustrates a cross-section of the plunger 11. It will be noted that the radial slots 66 extend to a depth of about one-third of the diameter and are substantially coextensive with the plunger in the axial direction thereof. Towards the ends of the plunger, however, the depth of the slots is slightly reduced with regard to the mechanical strength of the plunger. According to Fig. 2, eight such slots are provided. The larger the number of the slots is, the more effective will they be. The radial slots 67 provided in the pole-pieces 12 and 13 extend clear through the pole-piece, as will appear from Fig. 5 showing a plan view of the pole-piece 12. The different numerous axially extending fingers formed by the slots 67 are united by a comparatively thin plate or flange integral with the sectors. Preferably, the radial slots 67 extend into the flange or plate to a certain depth, for instance, half of the thickness of the flange, as shown in Fig. 1, whereby the induction of eddy-currents therein is reduced.

In these flanges and in the annular member 14, the eddy-currents flow in a peripheral direction. For this reason, the annular member 14 is provided with radial slots 68 too, as shown in Fig. 6, to increase the electric resistance to eddy-currents. The slots may be provided in the outer periphery of the annular member 14 only, as shown in the upper part of Fig. 6, or the slots may be alternately provided in the outer and in the inner periphery, as shown in the lower part of Fig. 6. Preferably, the annular member 14 is made of laminated material, the different sheet-metal plates being united by rivets.

The slots 67 and 68 in the pole-pieces 12 and 13 are preferably made sufficiently wide as to provide for ventilation of the interior of the tool for cooling purposes. Fresh air may be drawn into the tool from the outside atmosphere by the plunger through holes 15' provided in the mantle tube 15, as shown in Fig. 1. The air flows through a gap left between the periphery of the coil 25 and the inner surface of the mantle tube 15 and flows through the slots 67 and enters the interior of the tube 16, thus cooling all of these elements.

When the tool is to be used in an atmosphere filled with dust, no holes 15' should be provided. Nevertheless, the intense circulation of the air agitated by the reciprocatory armature will promote the conveyance of the heat produced in the interior of the coils towards the outer surfaces, particularly to the mantle tube 15.

To reduce sparking and arcing on the contacts 28, 28 and 29, 29' quenching condensers 39 and 40 are provided. The capacity of these condensers is of controlling importance for the development of the electric current upon interruption of the circuits and thus for the efficiency of the tool and, for this reason, should depend on the characters of the coils. This means that the capacity of the condenser coordinated to the striking coil should be substantially larger, about twice, three times, or four times as large, than that of the condenser coordinated to the returning coil. As very high capacities amounting to several thousand micro/farads are required when direct current of a low voltage is employed, I prefer to employ electrolytic condensers.

The operation of electromagnetic tools of the percussion type with current of a low voltage offers important advantages regarding the reliability in operation. Preferably, the voltage should be less than the arcing voltage of the contact material employed for the contacts 28, 28 and 29, 29', that is to say, should lie below a limit from 25 to 30 volts. In this event, the risk is eliminated that an arc which might form on account of a temporary disturbance in the contact operation, would stay and would destroy the interrupter. If the tool were operated with a current of higher voltage, the formation of an arc would have destructive effects. Furthermore, the use of a low voltage permits a further simplification of the interrupter, as the gap between the contacts need not be larger than one-fourth to 1 mm. Moreover, the insulation may be thin. As to the magnet coils, the low voltage has the advantage that on account of the smaller number of turns and of the greater cross-section of the conductors, the coils will represent a rugged structure which is not liable to be affected by the percussive stresses. The use of a low voltage of operation is not limited to tools of small power. I have found that it offers particular advantages if applied to large tools having a power of 1 kilowatt or more.

Although the above explanation of my invention will enable any electrical engineer to so design the electric tool and to so dimension its elements that the beneficial results of my invention will be obtained, suitable dimensions of the specific embodiment shown in Fig. 1 will be given hereinafter by way of example. It is to be clearly understood, however, that my invention is in no way limited to these specific dimensions.

The diameter of the armature plunger may be 32 mm. and its stroke 35 mm. In this event, the striking coil 25 is preferably wound of wire having a cross-section of 3.8 mm. and a diameter of 2.2 mm. The number of its turns is 180. The wire of which the returning coil 26 is wound has a diameter of 1.3 mm. and a cross-section of 1.32 mm. The number of turns is 358. The operating voltage amounts to from 20 to 22 volts. With the interrupter as shown, the tool will have a frequency of percussion amounting to 22 strokes per second, on the average.

A calculation taking in consideration that the circuits of both coils are simultaneously closed for a short period of time and that the striking stroke and the returning stroke require a different time, has the following result:

The period of energization of the striking coil is about .015 second. The period of energization of the returning coil is approximately .036 second. The resistance of the entire circuit of the striking coil is .21 ohm. The magnetic conductivity of the flux at the beginning of the downward stroke is 8.2 cm. The resulting time constant of the striking coil is .016 second. The time constant ratio of the striking coil is 1.06. The resistance of the entire circuit of the returning coil amounts to .89 ohm. The permeance at the beginning of the upward stroke (with rod 17 consisting of magnetic material) amounts to 12.2 cm. and the resulting time constant of the returning coil computed for the beginning of the upward stroke is .022 second. The time constant ratio of the returning coil is .61. The electric energy consumption of both coils is about 420 watts.

The attainment of a high efficiency of the tool requires that the closure and the interruption of the circuit of the magnet coils be very accurate. While the accuracy of the interrupter illustrated in Figs. 1, 2 and 3 is quite satisfactory, I have devised improved interrupters of which two modifications are shown in Figs. 10, 11, 12 and 13. These interrupters operate on the principle of the overcentering toggle. In Figs. 10 and 11, the elements corresponding to the embodiment shown in Fig. 1 are designated by the same reference numerals. I have modified the arrangement of the pairs of contacts 128, 128' and 129, 129' and of the spring-leaves 131 and 132 and of the terminals 138, while the function of these elements is the same as that of the corresponding elements in Fig. 1. It will be noted that the contacts 128' and 129' are mounted on a common spring-leaf 148 which may be bent upwardly or downwardly to interrupt and close the circuits alternately. The spring-leaves 131 and 132 mounted above and below the spring-leaf 148 may be reinforced by auxiliary leaves 131' and 132'. All of the spring-leaves and the terminals 138 are mounted on the flange of the pole-piece 13 and are bolted thereto by insulated bolts 150, suitable insulating pieces 149 being interposed. A short link 151 has one end hinged to the free end of the middle spring-leaf 148 and the other end pivotally mounted in a rigid bracket 152 attached to the pole-piece. In the embodiment shown in Fig. 10, link 151 is formed by a helical spring which is so biased as to exert pressure on the free end of the spring 148. For the reduction of wear of the hinges or pivot points, small bushings 153 of bronze may be provided which are freely rotatable on pins 154 inserted in the free ends of the spring 148 and of the bracket 152 and are engaged by the ends of the link 151 as shown in Fig. 11.

In the embodiment illustrated in Fig. 10*a*, the link 251 corresponding to the link 151 of Fig. 10, is rigid while the bracket 252 is made of spring-material, for instance of a thin steel ribbon. The link 151 or 251 and the spring-lead 148 form an overcentering toggle tending under the pressure exerted by the link 151 or by the bracket 252 to assume the collapsed upper or lower position in which the spring 148 is deflected upwardly or downwardly, thus closing one or the other of the pairs of contacts. The alternate closure and interruption of the circuits of the magnet coils is directly effected by the armature.

To this end, the shoulder 59 and the nut 18' act on the spring-leaf 148 in upward or downward direction through the intermediary of interposed helical springs 155 and 155'. Owing to the provision of the springs, a percussive effect on the spring-leaf 148 is avoided. The spring-leaves 131 and 132 are provided with large openings affording a free passage to the rod 17 and the helical springs 155 and 155', whereas the opening provided in the spring-leaf 148 for the passage of the rod 17 is so small that the springs 155 and 155' may abut against the spring-leaf 148.

The modification illustrated in Figs. 12 and 13 is similar to that of Figs. 10 and 11 differing therefrom by the provision of a single comparatively thin spring-leaf 348 acting as a toggle. Both ends of this spring-leaf are firmly clamped between insulating elements 349 and 56 attached to the pole-piece 13 by bolts 350 and 57 in such a way that the spacing of these clamping elements is slightly smaller than the free length of the interposed spring-leaf 348. Therefore, the spring-leaf is slightly biased and tends to assume an upper or a lower position in which it is bent. Two auxiliary spring-leaves 348'' are riveted to the spring-leaf 348 and project into the path of shoulder 59 and of the elongated nut 318 on the rod 17, as will appear from Fig. 12. The three leaves 348 and 348'' are provided with openings for the free passage of the rod 17. It is evident that the alternate engagement of one or the other of the spring-leaves 348'' by the shoulder 59 or the nut 318 causes the spring-leaf 348 to jump into its other resting positon. The spring-leaf 348 carries the two contacts 128' and 129' which cooperate with the counter-contacts 128 and 129 mounted on spring-leaves 331 and 332. As described with reference to Fig. 10, the various spring-leaves and the associated terminals 338 are rigidly mounted on the pole-piece 13 by means of interposed insulating plates 349 and of the insulated bolts 350.

If the right-hand end of the leaf 348 clamped between the insulating blocks 56 were cut off, the rod 17 would still actuate the contacts but, in this event, there would be no snap action. From this consideration, it will become apparent that the spring-leaf 348 may be regarded as composed of two sections, one constituting the contact carrier supported between the insulating blocks 349 for operation by the reciprocating rod 17 and the other section clamped between the insulating block 56 constituting over-centering means. Therefore, the overcentering means is integral with the contact carrying section of the spring-leaf in this embodiment.

This modification of the interrupter has the advantage of the absence of hinges or pivot points or of other elements subject to frictional wear. As the most delicate element of tools of the type here under consideration is ordinarily the interrupter, the improvement thereof described hereinabove will greatly enhance the reliability of operation.

The described improvements resulting in an increased efficiency and specific percussive power are in no way limited to tools of the design illustrated in Fig. 1, but are broadly applicable to tools of any kind which are operated by direct current on the self-control principle.

The expression "volume," when used in the description of the two coils, means the product of the conductor cross-section multiplied by the number of windings.

Although I have described my invention with reference to certain species, I wish it to be clearly understood that numerous modifications may be made without departing from the spirit of my invention.

What I claim is:

1. Electromagnetic tool of the percussion type, comprising frame elements and a reciprocatory armature guided therein constituting two substantially closed magnetic flux circuits, two coils each associated with one of said circuits to induce a flux therein, a source of current, and an interrupter interposed between said coils and said source of current and adapted to be operated by said armature and to alternately close and interrupt the electric circuits of said coils, whereby said armature will be reciprocated by the alternate effect of the fluxes in said magnetic circuits, the interrupter, the number and cross-section of the turns of said coils and the mass, cross-section and stroke of the armature and of said frame elements being so dimensioned that the consequent electric energy consumption of the coils and the consequent frequency of oscillation of the armature will result in a ratio of the electric time constant of each coil which, when computed for the position assumed by the armature before the stroke thereof produced by said coil, divided by the period of energization of said coil is not less than .5.

2. Electromagnetic tool of the percussion type, comprising frame elements and a reciprocatory armature guided therein constituting two substantially closed magnetic flux circuits, two coils each associated with one of said circuits to induce a flux therein, a source of current, and an interrupter interposed between said coils and said source of current and adapted to be operated by said armature and to alternately close and interrupt the electric circuits of said coils, whereby said armature will be reciprocated by the alternate effect of the fluxes in said magnetic circuits, the interrupter, the number and cross-section of the turns of said coils and the mass, cross-section and stroke of the armature and of said frame elements being so dimensioned that the consequent electric energy consumption of the coils and the consequent frequency of oscillation of the armature will result in a ratio of the electric time constant of at least one of the coils which, when computed for the position assumed by the armature before the stroke thereof produced by said coil, divided by the period of energization of said coil is not less than .7.

3. Electromagnetic tool of the percussion type comprising frame elements and a reciprocatory armature guided therein constituting two substantially closed magnetic flux circuits, resilient buffer means and a tool-shank arranged on opposite sides of said flux circuits to be struck by said armature, a returning coil associated with the flux circuit adjacent to said buffer means, a striking coil having a smaller number of turns than said returning coil and being associated with the flux circuit adjacent to said tool shank, a source of current, and an interrupter adapted to be operated by said armature and to alternately connect said coils to said source of current, the resistance of the entire electric circuit of said returning coil being from three to six times as large as the resistance of the entire electric circuit of said striking coil.

4. Electromagnetic tool of the percussion type comprising frame elements and a reciprocatory armature guided therein constituting two substantially closed magnetic flux circuits, a buffer spring and a tool shank arranged on opposite sides of said flux circuits to be struck by said armature, a returning coil associated with the flux circuit adjacent to said buffer spring, a striking coil having a smaller number of turns than said returning coil and being associated with the flux circuit adjacent to said tool shank, a source of current and an interrupter interposed between said source of current and said coils and adapted to be operated by said armature, the resistance of the entire electric circuit of said returning coil being from three to six times as large as the resistance of the entire electric circuit of said striking coil, the interrupter, the cross-section and stroke of said armature and of said frame elements and the number and cross-section of the turns of said coils being so dimensioned that the consequent electric energy consumption of the coils and the consequent frequency of oscillation of the armature will result in a ratio of the electric time constant of said striking coil which, when computed for the end position of the armature abutting against said buffer spring, divided by the period of energization of said striking coil exceeds the amount of .7.

5. Electromagnetic tool of the percussion type comprising frame elements and a reciprocatory armature guided therein, two coils of different dimensions arranged to produce alternate fluxes causing said armature to reciprocate, a source of current, and an interrupter adapted to be operated by said armature and to alternately connect said coils to said source of current, the aforestated elements being so dimensioned that the consequent frequency of oscillation of said armature will result in a time constant ratio of each coil exceeding .5.

6. Electromagnetic tool of the percussion type comprising a mantle-tube of magnetic material, pole-pieces inserted in the ends of said tube and having inward projections, an annular pole member inserted in said mantle tube between the ends thereof, an inner tube of diamagnetic materials carried by said projections and extending through said pole member, an armature guided for reciprocation between said projections within said inner tube, two coils mounted between said tubes on either side of said annular pole member, each adapted to induce a magnetic flux through one half of said mantle-tube, through the pole-piece coordinated therewith, through said armature and through the annular pole member, a source of current, and an interrupter interposed between said source of current and said coils and adapted to be operated by said armature and to alternately close and interrupt the electric circuits of said coils, whereby said armature will be reciprocated by the alternate effect of the fluxes produced by said coils, the aforestated elements being so dimensioned that the consequent electric energy consumption of the coils and the consequent frequency of oscillation of the armature will result in a time constant ratio of each of said coils exceeding the amount of .5.

7. Electromagnetic tool of the percussion type comprising a mantle-tube of magnetic material, pole-pieces inserted in the ends of said tube and having inward projections, an annular pole-member inserted in said mantle-tube between the ends thereof, an inner tube of diamagnetic material carried by said projections and extending through said annular pole member, an armature guided for reciprocation between said projections within said inner tube, a buffer spring and a tool shank arranged near the opposite ends of said mantle tube to be struck by said armature, a returning coil mounted between said tubes adjacent to said buffer spring, a striking coil having a smaller number of turns and a larger conductor cross section than said returning coil and being mounted between said tubes adjacent to said tool shank, a source of current and an interrupter adapted to be operated by said armature and to alternately connect said coils to said source of current, the resistance of the entire electric circuit of said returning coil being from three to six times as large as the resistance of the entire electric circuit of said striking coil.

8. Electromagnetic tool of the percussion type comprising a mantle-tube of magnetic material, pole-pieces inserted in the ends of said tube and having inward projections, an annular pole-member inserted in said mantle-tube between the ends thereof, an inner tube of diamagnetic material carried by said projections and extending through said annular pole member, an armature guided for reciprocation between said projections within said inner tube, a buffer spring and a tool shank arranged near the opposite ends of said mantle-tube to be struck by said armature, a returning coil mounted between said tubes adjacent to said buffer spring, a striking coil having a smaller number of turns than said returning coil and being mounted between said tubes adjacent to said tool shank, a source of current, and an interrupter adapted to be operated by said armature and to alternately connect said coils to said source of current, the resistance of the entire electric circuit of said returning coil being from three to six times as large as the resistance of the entire electric circuit of said striking coil, the interrupter, the cross-section and stroke of said armature and the dimensions of said mantle-tube and said pole elements and the number and cross-section of the turns of said coils being so dimensioned that the consequent electric energy consumption of the coils and the consequent frequency of oscillation of the armature will result in a ratio of the electric time constant of said striking coil which, when computed for the end position of the armature abutting against said buffer spring, divided by the period of energization of said striking coil exceeds the amount of .7.

9. Electromagnetic tool of the percussion type comprising frame elements and a reciprocatory armature guided therein constituting two substantially closed magnetic flux circuits, resilient buffer means and a tool shank arranged on opposite sides of said flux circuits to be struck by said armature, a returning coil associated with the flux circuit adjacent to said buffer means, a striking coil having a smaller number of turns than said returning coil and being associated with the flux circuit adjacent to said tool shank, a source of current, an interrupter adapted to be operated by said armature and to alternately connect said coils to said source of current, and two quenching condensers each coordinated to one of said coils, the resistance of the entire electric circuit of said returning coil being from three to six times as large as the resistance of the entire electric circuit of said striking coil, and the capacity of the condenser coordinated to the striking coil being from two to four times as large as the capacity of the condenser coordinated to the returning coil.

10. Electromagnetic tool of the percussion type comprising frame elements and a reciprocatory armature guided therein constituting two substantially closed magnetic flux circuits of different length, resilient buffer means and a tool shank arranged on opposite sides of said flux circuits to be struck by said armature, a returning coil associated with the flux circuit adjacent to said buffer means, a striking coil having a smaller number of turns than said returning coil and being associated with the flux circuit adjacent to said tool shank, a source of current, an interrupter adapted to be operated by said armature and to alternately connect said coils to said source of current, and two electrolytic condensers each coordinated to one of said coils and arranged in shunt with the contacts of said interrupter, the resistance of the entire electric circuit of said returning coil being from three to six times as large as the resistance of the entire electric circuit of said striking coil, and the capacity of the electrolytic condenser coordinated to the striking coil being from two to four times as large as the capacity of the electrolytic condenser coordinated to the returning coil.

11. Electromagnetic tool of the percussion type comprising frame elements and a reciprocatory armature guided therein, two coils arranged to produce alternate fluxes causing said armature to reciprocate, a source of current, and an interrupter adapted to be operated by said armature and to alternately connect said coils to said source of current, said interrupter consisting of two pairs of contacts, each pair comprising one contact mounted on said frame elements and one contact mounted on a spring-leaf common to both of said pairs and adapted to be deflected by said armature in alternate directions, and overcentering means associated with said spring-leaf, the afore-stated elements being so dimensioned that the consequent frequency of oscillation of said armature will result in a time constant ratio of each coil exceeding .5.

12. Electromagnetic tool of the percussion type comprising frame elements and a reciprocatory armature guided therein, two coils arranged to produce alternate fluxes causing said armature to reciprocate, a source of current, and an interrupter adapted to be operated by said armature and to alternately connect said coils to said source of current, said interrupter including a contact-carrying spring-leaf, springs interposed between said spring-leaf and opposed abutting faces of said armature, and over-centering means associated with said spring-leaf, the aforestated elements being so dimensioned that the consequent frequency of oscillation of said armature will result in a time constant ratio of each coil exceeding .5.

13. Electromagnetic tool of the percussion type comprising frame elements and a reciprocatory armature guided therein, two coils arranged to produce alternate fluxes causing said armature to reciprocate, a source of current, and an interrupter adapted to be operated by said armature and to alternately connect said coils to said source of current, said interrupter including a contact-carrying spring-leaf, means for holding the ends of said leaf in fixed relationship to said frame elements at a distance smaller than the length of said leaf, whereby the spring-leaf will bulge downwardly or upwardly, and resilient means cooperating with the armature and adapted, owing to the reciprocatory movement of the same, to alternately cause said spring-leaf to jump to one or the other of its bulged positions, the afore-stated elements being so dimensioned that the consequent frequency of oscillation of said armature will result in a time constant ratio of each coil exceeding .5.

14. Electromagnetic tool of the percussion type, comprising frame elements and a reciprocatory armature guided therein constituting two substantially closed magnetic flux circuits, two coils each associated with one of said circuits to induce a flux therein, a source of direct current having a voltage below a limit of 25 to 30 volts, and an interrupter interposed between said coils and said source of current and adapted to be operated by said armature and to alternately close and interrupt the electric circuits of said coils, whereby said armature will be reciprocated by the alternate effect of the fluxes in said magnetic circuits, the interrupter, the number and cross-section of the turns of said coils and the mass, cross-section and stroke of the armature and of said frame elements being so dimensioned that the consequent electric energy consumption of the coils and the consequent frequency of oscillation of the armature will result in a ratio of the electric time constant of each coil which, when computed for the position assumed by the armature before the stroke thereof produced by said coil, divided by the period of energization of said coil is not less than .5.

15. Electromagnetic tool of the percussion type, comprising frame elements and a reciprocatory armature guided therein constituting two substantially closed magnetic flux circuits, two coils each associated with one of said circuits to induce a flux therein, a source of direct current having a voltage below a limit of 25 to 30 volts, and an interrupter interposed between said coils and said source of current and adapted to be operated by said armature and to alternately close and interrupt the electric circuits of said coils, whereby said armature will be reciprocated by the alternate effect of the fluxes in said magnetic circuits, the interrupter, the number and cross-section of the turns of said coils and the mass, cross-section and stroke of the armature and of said frame elements being so dimensioned that the consequent electric energy consumption of the coils and the consequent frequency of oscillation of the armature will result in a ratio of the electric time constant of at least one of the coils which, when computed for the position assumed by the armature before the stroke thereof produced by said coil, divided by the period of energization of said coil is not less than .7.

16. Electromagnetic tool of the percussion type comprising frame elements and a reciprocatory armature guided therein constituting two substantially closed magnetic flux circuits of different length, resilient buffer means and a tool shank arranged on opposite sides of said flux circuits to be struck by said armature, a returning coil associated with the flux circuit adjacent to said buffer means, a striking coil having a smaller number of turns than said returning coil and being associated with the flux circuit adjacent to said tool shank, a source of direct current having a voltage below a limit of 25 to 30 volts, and an interrupter adapted to be operated by said armature to alternately connect said coils to said source of current, the resistance of the entire electric circuit of said returning coil being from three to six times as large as the resistance of the entire electric circuit of said striking coil.

17. Electromagnetic tool of the percussion type comprising frame elements and a reciprocatory armature guided therein, two coils of different dimensions arranged to produce alternate fluxes causing said armature to reciprocate, a source of direct current having a voltage below a limit of 25 to 30 volts, and an interrupter adapted to be operated by said armature and to alternately connect said coils to said source of current, the afore-stated elements being so dimensioned that the consequent frequency of oscillation of said armature will result in a time constant ratio of each coil exceeding .5.

18. Electromagnetic tool of the percussion type comprising frame elements and a reciprocatory armature guided therein, two coils arranged to produce alternate fluxes causing said armature to reciprocate, a source of current, and an interrupter adapted to be operated by said armature and to alternately connect said coils to said source of current, said interrupter consisting of two pairs of contacts, each pair comprising one contact mounted on said frame elements and one contact mounted on a spring-leaf common to both of said pairs and adapted to be deflected by said armature in alternate directions, mounting means for said spring-leaf, and overcentering means connected with said mounting means and integral with said spring-leaf, the aforestated elements being so dimensioned that the consequent frequency of oscillation of said armature will result in a time constant ratio of each coil exceeding .5.

19. Electromagnetic tool of the percussion type comprising frame elements and a reciprocatory armature guided therein constituting two substantially closed magnetic flux circuits, two coils each associated with one of said circuits to induce a flux therein, the first coil having a larger number of turns and a smaller conductor cross-section than the second coil, the volumes of said coils being equal to one another, a resilient buffer means for said armature arranged adjacent to said first coil, a tool shank adapted to be struck by said armature and arranged adjacent to said second coil, a source of current, and an interrupter adapted to be operated by said armature and to alternately connect said coils to said source of current, the electrical time constant ratio of the second coil, with reference to the initial position of the armature, being not larger than that of the first coil.

20. Electromagnetic tool of the percussion type, comprising frame elements and a reciprocatory armature guided therein constituting two substantially closed magnetic flux circuits, two coils each associated with one of said circuits to induce a flux therein, a source of current, means for alternately energizing said two coils whereby said armature will be reciprocated by the alternate effect of the fluxes, the number and cross-section of the turns of said coils and the mass, cross-section and stroke of the armature and of said frame elements being so dimensioned that the consequent electric energy consumption of the coils and the consequent frequency of oscillation of the armature will result in a ratio of the electric time constant of each coil which, when computed for the position assumed by the armature before the stroke thereof produced by said coil, divided by the period of energization of said coil is not less than .5.

21. In an electromagnetic tool of the percussion type, frame elements and a reciprocatory armature guided therein constituting two substantially closed magnetic flux circuits, two coils each associated with one of said circuits to induce a flux therein, a source of current, and means for alternately energizing said two coils whereby said armature will be reciprocated by the alternate effect of the fluxes, the number and cross-section of the turns of said coils and the mass, cross-section and stroke of the armature and of said frame elements being so dimensioned that the consequent electric energy consumption of the coils and the consequent frequency of oscillation of the armature will result in a ratio of the electric time constant of at least one of the coils which, when computed for the position assumed by the armature before the stroke thereof produced by said coil, divided by the period of energization of said coil is not less than .7.

22. In an electromagnetic tool of the percussion type frame elements and a reciprocatory armature guided therein, two coils of different dimensions arranged to produce alternate fluxes causing said armature to reciprocate, a source of current, and means for alternately energizing said two coils, the afore-stated elements being so dimensioned that the consequent frequency of oscillation of said armature will result in a time constant ratio of each coil exceeding .5.

23. In an electromagnetic tool of the percussion type frame elements and a reciprocatory armature guided therein constituting two substantially closed magnetic flux circuits, resilient buffer means and a tool-shank arranged on opposite sides of said flux circuits to be struck by said armature, a returning coil associated with the flux circuit adjacent to said buffer means, a striking coil associated with the flux circuit adjacent to said tool-shank, and means for alternately energizing the two coils in accordance with the movements of said armature, the coils being so dimensioned with respect to the impressed voltage that the instantaneous values of the input energy of said striking coil are substantially larger than the corresponding values of the input energy of said returning coil.

24. In an electromagnetic tool of the percussion type frame elements and a reciprocatory armature guided therein constituting two substantially closed magnetic flux circuits, resilient buffer means and a tool-shank arranged on opposite sides of said flux circuits to be struck by said armature, a returning coil associated with the flux circuit adjacent to said buffer means, a striking coil associated with the flux circuit adjacent to said tool-shank, and means for alternately energizing the two coils in accordance with the movements of said armature, the coils being so dimensioned with respect to the impressed voltage that the power intake of said two coils is substantially equal.

25. In an electromagnetic tool of the percussion type frame elements and a reciprocatory armature guided therein constituting two substantially closed magnetic flux circuits, resilient buffer means and a tool-shank arranged on opposite sides of said flux circuits to be struck by said armature, a returning coil associated with the flux circuit adjacent to said buffer means, a striking coil associated with the flux circuit adjacent to said tool-shank, and means for alternately energizing the two coils in accordance with the movements of said armature, the coils being so dimensioned with respect to the impressed voltage that the power intake of the returning coil is not in excess of that of the striking coil.

26. In an electromagnetic tool of the percussion type frame elements and a reciprocatory armature guided therein constituting two substantially closed magnetic flux circuits, resilient buffer means and a tool-shank arranged on opposite sides of said flux circuits to be struck by said armature, a returning coil associated with the flux circuit adjacent to said buffer means, a striking coil associated with the flux circuit adjacent to said tool-shank, and means for alternately energizing the two coils in accordance with the movements of said armature, the electrical resistance of the two coils depending on the number of turns and on the conductor cross-section being so differently proportioned relative to the impressed voltages that the square of the voltage impressed on the striking coil divided by the resistance of the latter is materially larger than the square of the voltage impressed on the returning coil divided by the resistance of the latter.

MAX GREINER.